United States Patent
Brechter

(10) Patent No.: US 12,132,243 B2
(45) Date of Patent: Oct. 29, 2024

(54) FUEL CELL STACK, FUEL CELL DEVICE AND MOTOR VEHICLE WITH A FUEL CELL DEVICE

(71) Applicant: Audi AG, Ingolstadt (DE)

(72) Inventor: Michael Brechter, Möckmühl (DE)

(73) Assignee: AUDI AG, Ingolstadt (DE)

(*) Notice: Subject to any disclaimer, the term of this patent is extended or adjusted under 35 U.S.C. 154(b) by 363 days.

(21) Appl. No.: 17/792,691

(22) PCT Filed: Oct. 9, 2020

(86) PCT No.: PCT/EP2020/078398
§ 371 (c)(1),
(2) Date: Jul. 13, 2022

(87) PCT Pub. No.: WO2021/144046
PCT Pub. Date: Jul. 22, 2021

(65) Prior Publication Data
US 2023/0045498 A1    Feb. 9, 2023

(30) Foreign Application Priority Data

Jan. 14, 2020 (DE) .................. 10 2020 100 626.8

(51) Int. Cl.
| | |
|---|---|
| *H01M 8/248* | (2016.01) |
| *H01M 8/0432* | (2016.01) |
| *H01M 8/0438* | (2016.01) |
| *H01M 8/04492* | (2016.01) |
| *H01M 8/04828* | (2016.01) |

(52) U.S. Cl.
CPC ....... *H01M 8/248* (2013.01); *H01M 8/04358* (2013.01); *H01M 8/04425* (2013.01); *H01M 8/04492* (2013.01); *H01M 8/04835* (2013.01); *H01M 2250/20* (2013.01)

(58) Field of Classification Search
CPC ........ H01M 8/04358; H01M 8/04425; H01M 8/04492; H01M 8/04835; H01M 8/248
See application file for complete search history.

(56) References Cited

U.S. PATENT DOCUMENTS

| | | | | |
|---|---|---|---|---|
| 2011/0217617 | A1* | 9/2011 | Andreas-Schott | .... H01M 8/248 429/465 |
| 2017/0317365 | A1* | 11/2017 | Strahl | ................... H01M 8/045 |

FOREIGN PATENT DOCUMENTS

| | | |
|---|---|---|
| DE | 102008026858 A1 | 12/2008 |
| DE | 102017206729 A1 | 11/2017 |
| DE | 102018210181 A1 | 12/2019 |
| JP | 2009176506 A | 8/2009 |

\* cited by examiner

*Primary Examiner* — Brittany L Raymond
(74) *Attorney, Agent, or Firm* — Seed IP Law Group LLP

(57) ABSTRACT

A fuel cell stack has a plurality of fuel cells arranged in a row, each of them comprising a membrane separating the electrodes, with ports for the respective supply and drainage of a fuel and an oxidizer and with a tensioning device for pressing the fuel cells together, wherein the tensioning device is formed by a band and spring system having an integrated force transducer, the signal of which can be relayed to a controller for determining the moisture content based on the moisture-dependent swelling behavior of the membrane of each fuel cell. A fuel cell device with such a fuel cell stack as well as a motor vehicle having such a fuel cell device are also provided.

10 Claims, 1 Drawing Sheet

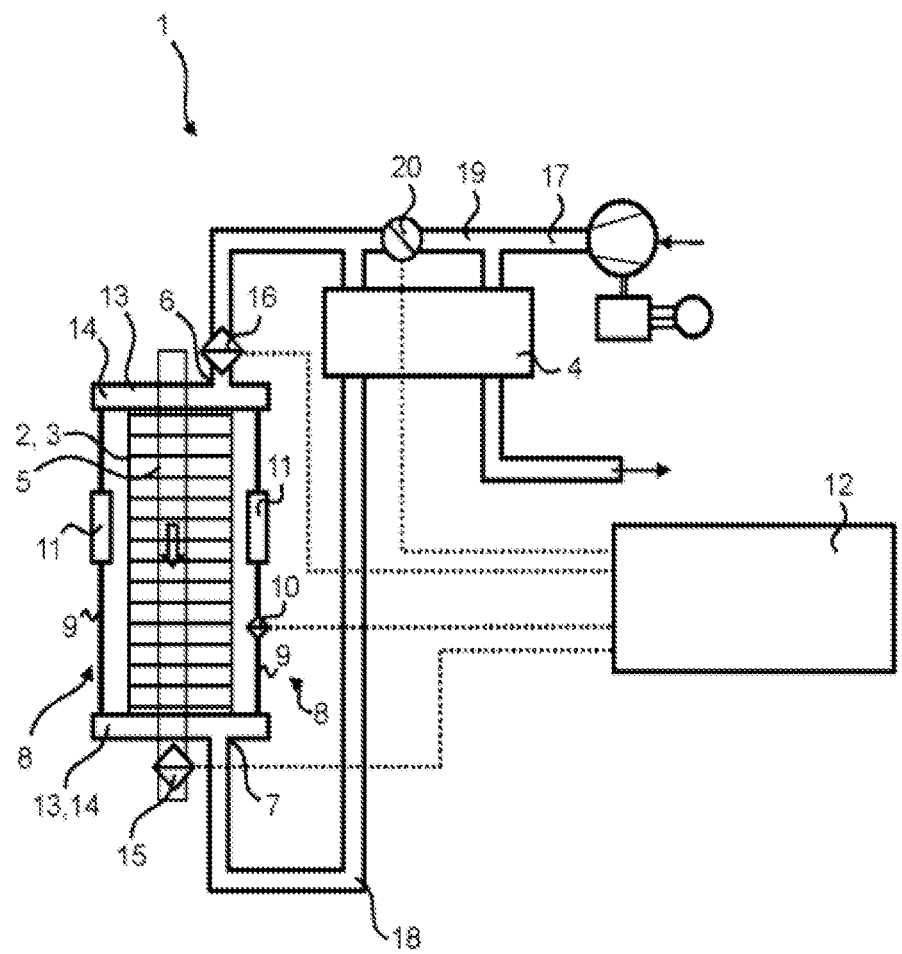

FUEL CELL STACK, FUEL CELL DEVICE AND MOTOR VEHICLE WITH A FUEL CELL DEVICE

BACKGROUND

Technical Field

Embodiments of the invention relate to a fuel cell stack having a plurality of fuel cells arranged in a row, each of them comprising a membrane separating the electrodes, with ports for the respective supply and drainage of a fuel and an oxidizer and with a tensioning device for pressing the fuel cells together, wherein the tensioning device is formed by a band and spring system having an integrated force transducer, the signal of which can be relayed to a controller for determining the moisture content based on the moisture-dependent swelling behavior of the membrane of each fuel cell. Embodiments of the invention further relate to a fuel cell device with a fuel cell stack as well as a motor vehicle having a fuel cell device.

Description of the Related Art

Fuel cell devices are used for the chemical transformation of a fuel with oxygen to form water, in order to generate electrical energy. For this, fuel cells contain as their key component a so-called membrane electrode unit, which is a combination of a proton-conducting membrane and respective electrodes situated on either side of the membrane (anode and cathode). Furthermore, gas diffusion layers may be arranged on either side of the membrane electrode unit at the sides of the electrodes facing away from the membrane. In operation of the fuel cell device with a plurality of fuel cells combined to form a fuel cell stack, the fuel, especially hydrogen $H_2$ or a hydrogen-containing gas mixture, is supplied to the anode, where an electrochemical oxidation of $H_2$ to $H^+$ takes place, giving off electrons. A transport of the protons $H^+$ (water-bound or water-free) from the anode space to the cathode space occurs through the electrolyte or the membrane, which electrically insulates and separates the reaction spaces from each other in gas-tight manner. The electrons provided at the anode are conveyed by an electrical conduit to the cathode. The cathode is supplied with oxygen or an oxygen-containing gas mixture, so that a reduction of $O_2$ to $O^{2-}$ occurs, taking up the electrons. At the same time, these oxygen anions react in the cathode space with the protons transported across the membrane to form water.

Fuel cell devices require a careful water management, since on the one hand this is needed in order to prevent too much water being present in the fuel cell or in the fuel cell stack, resulting in a blockage of the flow ducts for supply of the reactants. On the other hand, if there is too little water in the fuel cell, the proton conductivity of the membrane is affected, so that one must make sure of an adequate moisture and water supply for the membrane. In a fuel cell device, too high a liquid content in the fuel cell stack furthermore results in damage and thus a shorter service life, as well as impaired efficiency of the fuel cell device.

It is known how to employ humidifiers for the water management. Humidifiers are used to bring about a transfer of moisture in the case of two gaseous media having different moisture content to the drier medium. Such gas/gas humidifiers are used in particular in fuel cell devices where air with the oxygen contained therein is compressed in the cathode circuit to supply the cathode spaces of the fuel cell stack, so that relatively warm and dry compressed air is present, the moisture of which is not sufficient for use in the fuel cell stack for the membrane electrode unit. The dry air provided by the compressor for the fuel cell stack is humidified by moving it past the membrane, which is permeable to water vapor, the other side of which is washed by the moist exhaust air from the fuel cell stack.

This plurality of fuel cells assembled in a fuel cell stack is generally pressed together with the aid of tension elements having a force in the range of several tons, in order to achieve a sufficient contact pressure on the catalyst-coated membrane for the reduction with no ohmic losses and to avoid leakage of the seals used, thanks to the large compression force.

It must be understood that forces will arise during the operation of the fuel cell stack which may lead to an increasing or decreasing of the compression force. The increasing of the compression force is caused by a thermal expansion of the components used, by the pressure used for the supplying and distributing of the reactants, and by a swelling of the membrane upon being hydrated.

A decreasing of the compression force may occur due to a negative thermal expansion in the case of decreasing or low temperatures, or by the settlement behavior of the gas diffusion layers, which increases with increasing length of use and thus the age of the fuel cell stack.

It is desirable to determine as accurately as possible the stack moisture, for which moisture sensors can be used, being positioned at the port for fresh air on the fuel cell stack. However, these known moisture sensors are complex, sluggish, fault-prone, and costly. A model-based determination of the moisture using the operating parameters with a software model requires a very large development expense, since the model needs to be validated for each operating mode and the ambient conditions.

In DE 10 2017 206 729 A1 it is therefore proposed to evaluate the moisture-dependent swelling behavior of the membranes in a fuel cell stack, for which a pressure sensor is employed, detecting the pressure with which the tensioning device is acting on the fuel cell stack. For this, four hinged levers are secured to a clamping plate, lying with their free ends against an end plate. Between these plates there are arranged spring elements and piezo-elements, and the pressure detected by the piezo-elements is supplied to a control device. This configuration increases the design space needed, since the length dimension of the fuel cell stack is increased. Furthermore, there is a complex layout with the four hinged levers, influencing the measurement result due to the diverting of forces and the friction.

DE 10 2008 026 858 A1 describes the use of a compression maintenance system with multiple resilient belts, exerting a compression force on the fuel cell stack, the belts being designed to adapt to an extension of the fuel cell stack and to maintain the compression force in a nominal range. JP 2009176506 A proposes a detecting and evaluating of the impedance and the conductivity of the fuel cell stack by means of sensors in order to improve the accuracy in the moisture determination.

BRIEF SUMMARY

Some embodiments simplify the construction for the determination of the moisture of a fuel cell stack. Some embodiments provide an improved fuel cell device and an improved motor vehicle.

A fuel cell stack may be characterized in that the tensioning device for pressing the fuel cells together is formed by a band and spring system having an integrated force transducer. The signal of the force transducer is relayed to a controller for determining the moisture based on the moisture-dependent swelling behavior of the membrane of each fuel cell. Hence, such embodiments have a very simple construction with direct determination of the force acting in the band and spring system.

The fuel cells in the end positions are associated with end plates, at which the tensioning device for applying of force is connected, while the end plates reach beyond the fuel cells and the tensioning device is tensioned between the end plates on two opposite sides of the fuel cells in the edge region of the end plates reaching beyond the fuel cells, past the fuel cells. This avoids an increasing in the length dimension of the fuel cell stack. The band and spring system of the tensioning device is also provided twice, associated on each side of the fuel cells, and at least one of the band and spring systems comprises the force transducer designed as an electrical traction sensor, comprising a strain gage strip.

The accuracy of the moisture determination is improved in that sensors are provided for detecting the temperature and the pressure, the signals of which can be relayed to the controller for factoring in their contribution to the traction force in the tensioning device. The arrangement of the sensors is chosen such that the sensor for the temperature detecting is arranged at the outlet of a flow path in the fuel cell stack for the coolant.

A fuel cell device having a fuel cell stack as described above, having a fresh air line which is fluidically connected to the port for supplying the oxidizer and which is associated with a compressor and, downstream from the compressor, a humidifier, having a cathode exhaust gas line leading from the port for drainage of the oxidizer to the humidifier, and having a humidifier bypass line fluidically connected to the fresh air line, in which a regulated valve is situated, affords the simple possibility of regulating the moisture content by adjusting the setting of the regulated valve by the controller in dependence on the moisture as determined by the controller. Thus, the proportion of free air taken through the humidifier can be varied.

In this fuel cell device the possibility also exists of the sensor for detecting the pressure downstream from the humidifier being arranged in the fresh air line, where no further pressure drop occurs, and especially in the area of the port for the oxidizer.

The above described benefits and effects also apply accordingly to a motor vehicle as described herein, having such a fuel cell device.

The features and combinations of features mentioned in the specification, as well as the features and combinations of features mentioned below in the description of the figures and/or shown only in the FIGURES, can be used not only in the particular indicated combination, but also in other combinations or standing alone, without leaving the scope of the present disclosure. Thus, embodiments which are not explicitly shown or explained in the FIGURES, yet which emerge from and can be created by separate combinations of features from the embodiments which have been explained, should also be seen as being encompassed by the present disclosure.

BRIEF DESCRIPTION OF THE SEVERAL VIEWS OF THE DRAWINGS

Further benefits, features and details will emerge from the claims, the following description of embodiments, and the drawings.

FIG. 1 shows a schematic representation of a portion of a fuel cell device having a fuel cell stack.

DETAILED DESCRIPTION

FIG. 1 shows schematically a portion of a fuel cell device 1, this portion comprising a humidifier 4 for regulating the moisture of a plurality of fuel cells 3 assembled to form a fuel cell stack 2.

Each of the fuel cells 3 comprises an anode, a cathode, as well as a proton-conducting membrane which separates the anode from the cathode. The membrane is formed from an ionomer, such as a sulfonated polytetrafluorethylene polymer (PTFE) or a polymer of perfluorinated sulfonic acid (PFSA). Alternatively, the membrane can also be formed as a sulfonated hydrocarbon membrane.

The anodes and/or the cathodes may also have a catalyst mixed in with them, and the membranes may be coated on their first side and/or on their second side with a catalyst layer consisting of a precious metal or a mixture containing precious metals, such as platinum, palladium, ruthenium or the like, serving as a reaction accelerant in the reaction of the particular fuel cell 3.

Through an anode space, fuel, especially hydrogen, can be supplied to the anode from a fuel tank. In a polymer electrolyte membrane fuel cell (PEM fuel cell), fuel or fuel molecules are split up into protons and electrons at the anode. The PEM lets the protons pass through, but is not permeable to the electrons. At the anode, the reaction will occur: $2H_2 \rightarrow 4H^+ + 4e^-$ (oxidation/electron donation), for example. While the protons pass through the PEM to the cathode, the electrons are taken by an external circuit to the cathode or to an energy accumulator.

Through a cathode space, the cathode gas (such as oxygen or air containing oxygen) can be supplied to the cathode, so that at the cathode side the following reaction will occur: $O_2 + 4H^+ + 4e^- \rightarrow 2H_2O$ (reduction/electron uptake).

Since multiple fuel cells 3 are assembled in the fuel cell stack 2, a sufficiently large amount of cathode gas must be made available so that a large cathode gas mass flow or fresh gas flow is provided by a compressor, and due to the compressing of the cathode gas its temperature increases greatly. The conditioning of the cathode gas or the fresh air gas flow, i.e., its adjustment in terms of the desired temperature and humidity in the fuel cell stack 2, takes place in a humidifier 4 connected downstream from the compressor, which saturates the membranes of the fuel cells 3 with moisture in order to boost their efficiency, as this favors the proton transport.

The fuel cell stack 2 in addition to the flow paths for the gaseous reactants also has a flow path 5 for a coolant, which is incorporated in a coolant circuit.

The fuel cell stack 2 with the plurality of fuel cells 3 arranged in a row thus comprises ports for the respective supplying and drainage of the reactants, i.e., the fuel and the oxidizer. The fuel cell stack 2 also has a tensioning device 8 for pressing the fuel cells 3 together. The tensioning device 8 is formed by a band and spring system 9 with an integrated force transducer 10, the signal of which can be relayed to a controller 12 for determining the moisture content inside the fuel cell stack 2 or that of the fuel cells 3 forming this stack, the signal being determined by the swelling behavior of the membrane of each fuel cell 3, which is dependent on the moisture.

The fuel cells at the end positions are associated with end plates 13, to which the tensioning device 8 for the application of force is connected, wherein the end plates 13 reach beyond the fuel cells 3 and the tensioning device 8 is clamped between the end plates 13, past the fuel cells 3, on two or more opposite sides of the fuel cells 3 in the edge region 14 of the end plates 13 reaching beyond the fuel cells 3.

In order to avoid a one-sided application of force, the band and spring system 9 of the tensioning device 8 is provided twice or more than twice, associated on each side of the fuel cells 3, and at least one of the band and spring systems 9 comprises the force transducer 10 designed as an electrical traction sensor having a strain gage strip; in the embodiment shown, the force transducer 10 is associated with the right-hand band and spring system 9, in the force transmission chain between the end plates 13 comprising the spring 11.

Furthermore, sensors 15, 16 are provided for detecting the temperature and the pressure, the signals of which can be relayed to the controller 12 for factoring in their contribution to the traction force in the tensioning device 8. The sensor 15 for the temperature detection is arranged at the outlet of the flow path 5 for the coolant, while the sensor 16 for detecting the pressure downstream from the humidifier 4 is arranged in the fresh air line 17, especially at the port 6 for the oxidizer.

FIG. 1 shows that the fresh air line 17 is fluidically connected to the port 6 for supplying the oxidizer, the fresh air line 17 being associated with the compressor and, downstream from the compressor, the humidifier 4, to which the moisture from the cathode exhaust gas is supplied with the cathode exhaust gas line 18, leading from the port 7 for drainage of oxidizer to the humidifier 4. It should be noted that a humidifier bypass line 19 is present, fluidically connected to the fresh air line 17, in which a regulated valve 20 is situated, the setting of which can be adjusted by the controller 12 in dependence on the moisture as determined by the controller 12.

Such a fuel cell device 1 can be used in particular in a motor vehicle.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell stack, comprising:
a plurality of fuel cells arranged in a row, each of the fuel cells including a membrane separating electrodes, with ports for supply and drainage of a fuel and an oxidizer, and with a tensioning device for pressing the fuel cells together, wherein the tensioning device is formed by a band and spring system having an integrated force transducer, a signal of which can be relayed to a controller for determining a moisture content based on moisture-dependent swelling behavior of the membrane of each fuel cell.

2. The fuel cell stack according to claim 1, wherein fuel cells in end positions are associated with end plates, at which the tensioning device for applying of force is connected.

3. The fuel cell stack according to claim 2, wherein the end plates reach beyond the fuel cells and the tensioning device is tensioned between the end plates on two opposite sides of the fuel cells in edge regions of the end plates reaching beyond the fuel cells, past the fuel cells.

4. The fuel cell stack according to claim 3, wherein the band and spring system of the tensioning device is provided twice, associated on each side of the fuel cells, and at least one of the band and spring systems comprises the force transducer designed as an electrical traction sensor.

5. The fuel cell stack according to claim 4, wherein the traction sensor comprises a strain gage strip.

6. The fuel cell stack according to claim 1, wherein sensors are provided for detecting a temperature and a pressure, signals of which can be relayed to the controller for factoring in their contribution to the traction force in the tensioning device.

7. The fuel cell stack according to claim 6, wherein a flow path for a coolant is formed, and the sensor for the temperature detecting is arranged at an outlet of the flow path for the coolant.

8. A fuel cell device, comprising:
a fuel cell stack including a plurality of fuel cells arranged in a row, each of the fuel cells including a membrane separating electrodes, with ports for supply and drainage of a fuel and an oxidizer, and with a tensioning device for pressing the fuel cells together, wherein the tensioning device is formed by a band and spring system having an integrated force transducer, a signal of which can be relayed to a controller for determining a moisture content based on moisture-dependent swelling behavior of the membrane of each fuel cell;
a fresh air line which is fluidically connected to a port for supplying the oxidizer and which is associated with a compressor and, downstream from the compressor, a humidifier, having a cathode exhaust gas line leading from a port for drainage of the oxidizer to the humidifier, and having a humidifier bypass line fluidically connected to the fresh air line, in which a regulated valve is situated, the setting of which can be adjusted by the controller in dependence on the moisture as determined by the controller.

9. The fuel cell device according to claim 8, wherein a sensor for detecting a pressure downstream from the humidifier is arranged in the fresh air line.

10. A motor vehicle having a fuel cell device comprising:
a fuel cell stack including a plurality of fuel cells arranged in a row, each of the fuel cells including a membrane separating electrodes, with ports for supply and drainage of a fuel and an oxidizer, and with a tensioning device for pressing the fuel cells together, wherein the tensioning device is formed by a band and spring system having an integrated force transducer, a signal of which can be relayed to a controller for determining a moisture content based on moisture-dependent swelling behavior of the membrane of each fuel cell; and
a fresh air line which is fluidically connected to a port for supplying the oxidizer and which is associated with a compressor and, downstream from the compressor, a humidifier, having a cathode exhaust gas line leading from a port for drainage of the oxidizer to the humidifier, and having a humidifier bypass line fluidically connected to the fresh air line, in which a regulated valve is situated, the setting of which can be adjusted by the controller in dependence on the moisture as determined by the controller;
wherein a sensor for detecting a pressure downstream from the humidifier is arranged in the fresh air line.

* * * * *